April 4, 1950      G. D. WICKMAN      2,502,496
EQUALIZER FOR GROUND CONDUCTORS

Filed Sept. 30, 1944      2 Sheets-Sheet 1

GEORGE D. WICKMAN
INVENTOR.

BY

ATTORNEY

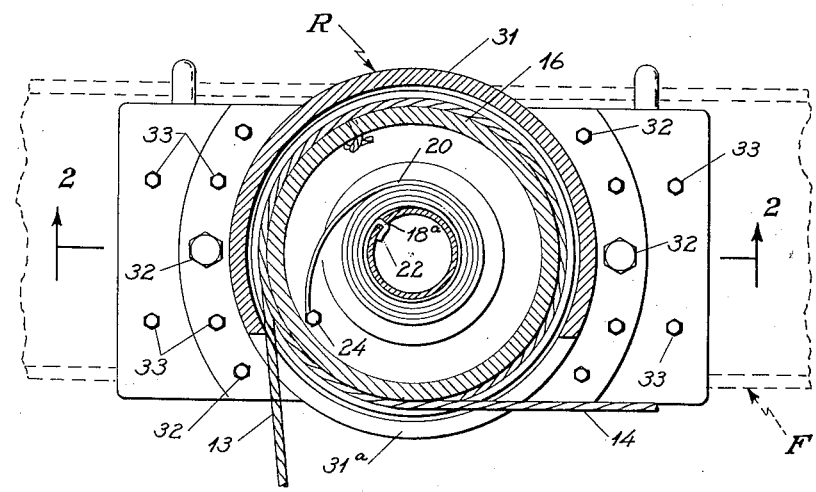
Fig. 3
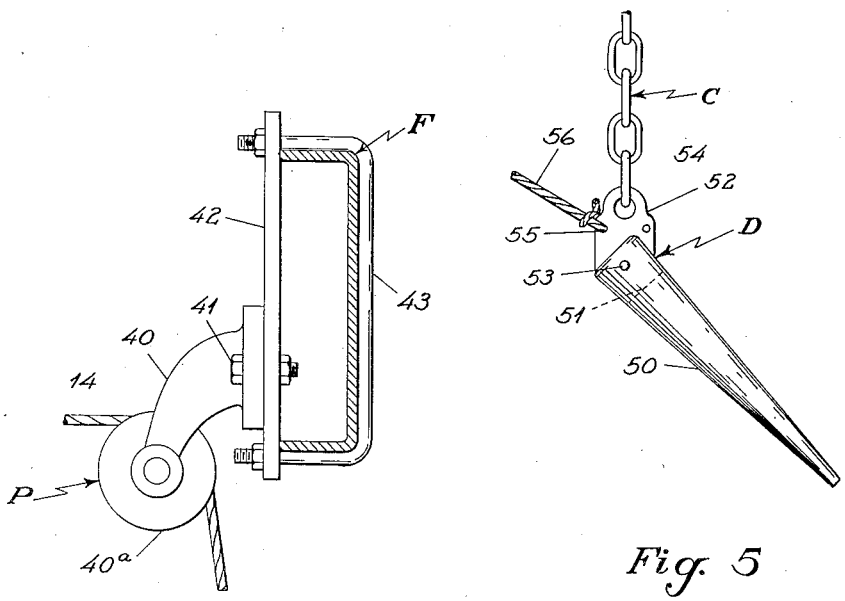
Fig. 4
Fig. 5
GEORGE D. WICKMAN
INVENTOR.
BY
ATTORNEY Patented Apr. 4, 1950

2,502,496

UNITED STATES PATENT OFFICE 2,502,496

EQUALIZER FOR GROUND CONDUCTORS

George D. Wickman, Denver, Colo.

Application September 30, 1944, Serial No. 556,610

7 Claims. (Cl. 175—264)

This invention relates to ground conductors for tank trucks or similar vehicles used for the transportation of inflammable fluids.

Some of the difficulties experienced with the usual conductors of this type are that under conditions of heavy loading a portion of the conductor assumes a prone position on the ground with resulting entanglement with switch frogs and other irregularities in the roadway surface; that the elevation of the depending end of such conductors varies with the load on such vehicle; that when an entanglement as aforesaid occurs the rigid connection to the truck frame is fractured due to the sudden application of tension; that the form of the trailing end of such conductors is susceptible to entanglement; that the unhampered oscillations of such conductors induced by the vehicle movement prevent continuous functioning in the ground circuit; and that in general they have been more or less unsatisfactory over extended periods of use.

It is a primary object of this invention to provide a ground conductor for tank trucks and the like which is durable and dependable in operation under variable load conditions, regardless of irregularities in the surface over which the vehicle moves.

Another object of the invention is to provide simple, durable and efficient means for suspending such ground conductors at a uniform distance above the ground independently of changing positions of the vehicle on which it is mounted.

Still another object of the invention is to provide means for the automatic adjustment of such a ground conductor during operation of the vehicle on which it is mounted.

A further object of the invention is to provide a ground conductor suspension possessing sufficient resilience to prevent damage to the vehicle or conductor when sudden tension is applied to the conductor.

A still further object of the invention is to provide a ground conductor, the trailing end of which is not susceptible to entanglement with ground or roadway irregularities.

Other objects reside in novel details of construction and novel combinations and arrangements of parts, all of which will be described in the course of the following description.

To afford an understanding of the invention, reference will now be made to the accompanying drawings illustrating a preferred embodiment of the invention. In the drawings, in the several views of which like parts have been designated similarly, Fig. 1 is a side elevation of a tank truck partially broken away to disclose the arrangement of parts embodying features of the invention installed on such truck;

Fig. 3 is a section taken along the line 3—3, Fig. 2;

Fig. 4 is a side elevation of a pulley member drawn to an enlarged scale, of the type shown in the installation illustrated in Fig. 1; and Fig. 5 is a side elevation of the trailing end of the ground conductor illustrated in Fig. 1.

Figure 2:
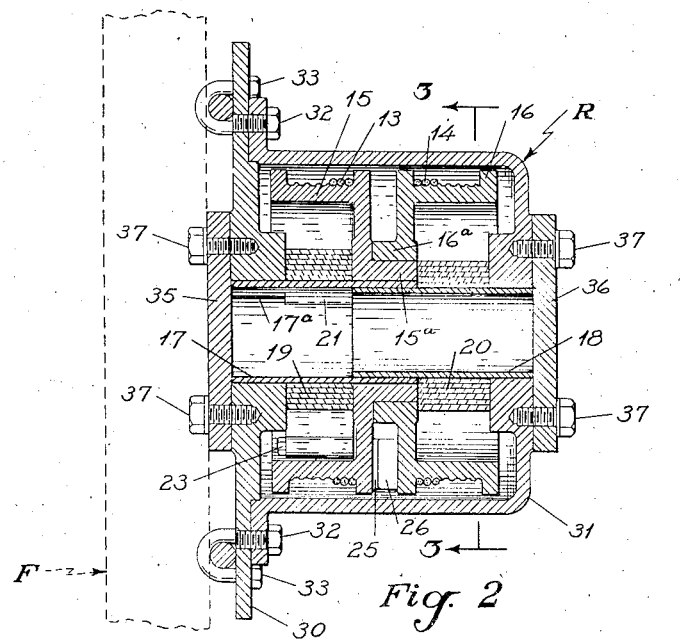
Fig. 2 is a central section through a reel element embodying features of the present invention.

The form of the invention illustrated in the drawings comprises mechanism inclusive of a cable adjusting mechanism and resilient supporting means, a cable guiding means and means suspended from said cable for conducting charges of static electricity to the ground. A preferred form of the cable adjusting and resilient supporting means is shown in Figs. 2 and 3 and comprises a reel element R having a hollow flanged spool or reel 15 and an outwardly projecting hub 15a upon which is rotatably mounted in spaced relation to said reel a second hollow spool or reel 16 having an outwardly projecting hub 16a seated upon hub 15a, and this entire assembly is mounted for free rotary movement upon a telescopic shaft assembly comprising an outer shaft member 17 and an inner shaft member 18.

A band spring 19 has its inner end secured to shaft 17 through a short hook portion 21 at its end being inserted in a longitudinal slot 17a in shaft 17. This spring is coiled about the shaft with its outer end secured to the interior wall of the hollow reel by means of a cap screw 23 or similar fastening. A second band spring 20 is mounted in a similar manner within reel 16 with its inner end secured within shaft portion 18 by a hook 22 inserted in slot 18a therein and having its outer end secured to the inner surface of reel 16 by a cap screw 24.

An ear or dog 25 projects from reel 15 toward reel 16 and engages a corresponding ear or dog 26 projecting from reel 16 to thereby restrict the relative rotation of the two reels to somewhat less than 360°. A base plate 30 provides a bearing support for shaft 17 and to this end is provided with a journal for the reception of the shaft as shown in Fig. 2, and has adjacent its periphery a series of holes for the insertion of U-bolts 33 or similar means for securing the assembly to the chassis or frame F of the vehicle.

A housing 31 serves as a bearing support for shaft portion 18 and also acts as an enclosure for the assembly hereinbefore described. This housing is in the form of a hollow cylinder positioned axially with respect to reels 15 and 16 and shaft portions 17 and 18, and has its inner end flanged for connection with the plate 30 as by cap screws 32 or the like.

The outer ends of shaft portions 17 and 18 project beyond base plate 30 and housing 31 and are notched for the reception of transversely positioned bars 35 and 36, respectively, by means of which tension is induced in the band springs 19 and 20 by rotating the bars and shaft portions in opposite directions. In this section the bars may be locked in selective positions by cap screws 37 or other similar means.

As will be best understood by reference to Fig. 3, an opening 31a, is formed in the lower portion of the cylindrical wall of housing 31 and provides access for a flexible wire or cable 13, the lower end of which is fastened to the rear axle housing A of the vehicle and then drawn taut by and wound around reel 15 through the tension in band spring 19. A second flexible wire or cable 14 is wound externally about reel 16 and extends rearwardly through opening 31 in the housing to a guide pulley unit P mounted on frame F of the vehicle.

As shown in Fig. 4, the pulley unit P comprises a sheave or pulley wheel 40a over which the cable 14 is reeved to support the ground conductor C. This wheel 40a is mounted for rotation on a supporting bracket 40 secured through the provision of bolts 41 or other similar means, on a base plate 42, and this plate is adapted to be attached to the vehicle frame or other part of the chassis by means of U-bolts 43 or similar clamping means.

A preferred form of a trailing end or drag D of ground conductor C has been illustrated in Fig. 5 and comprises a conical or tapered metallic member 50 supported at its apex by the surface over which the vehicle moves and arranged to be inclined therefrom through the provision of a slot 51 at its upper end in which a plate link 52 is loosely held on a pivot pin 53. Link 52 is supported at a fixed, predetermined distance above the ground surface by the ground conductor, here shown as a chain C, one link of which extends through an opening in link 52 provided for that purpose. The link also is apertured at 55 for the reception of a stay line 56 which connects with the axle A or other part of the truck structure as shown in Fig. 1, to restrain swinging movement of conductor C.

Figure 1:
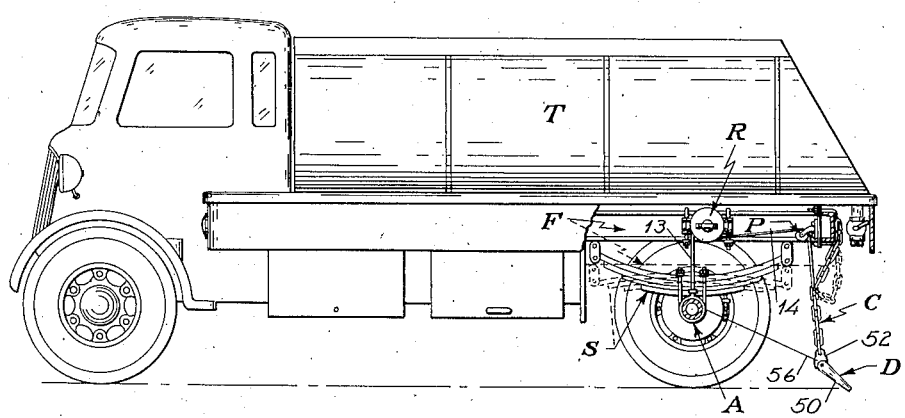

The operation of this embodiment of the invention will be best understood by reference to Fig. 1. The tank truck T shown therein is supported upon its rear axle housing A by means of semi-elliptical leaf springs S. The reel element R is fixed to the chassis or frame F of said vehicle in a position substantially in vertical alinement with rear axle housing A, and the flexible wire or cable 13 is connected from the rear axle to the reel element R in the manner hereinbefore described. The guide pulley unit P is permanently attached to the frame, preferably on its rear cross member, and the second flexible cable 14 extends from reel member R over the pulley and depends therefrom to attach to the ground conductor near its midpoint. This conductor C, here shown in the form of a chain, has its upper end fastened to the frame F of the vehicle and obtains additional suspending support from cable 14. Through this arrangement the assembly, and particularly conductor element C, provides an outlet for continuous discharge of static electricity to the ground during operation of the vehicle.

As shown in Fig. 1, when the tank truck is empty or only lightly loaded the leaf spring S assumes an upwardly concave shape and the truck and frame F is supported in the uppermost or full line position. At such times the ground chain C is supported in the full line position shown in Fig. 1.

It is manifest that when a heavier or full load is carried in the tank truck, the leaf springs S are deflected into a downwardly concave shape and the frame F is supported in a lower position as indicated by the dotted outlines, and unless adjustment is made in its support, the trailing end or drag D and a portion of the ground conductor C will assume a position prone upon the roadway surface. In this invention the lowering of the chassis or frame F upon loading relieves the tension in the flexible wire or cable 13 and its excess length or slack is taken up by a partial revolution of reel or spool 15 actuated by the band spring 19. Such movement imparts an equivalent and parallel rotation in the adjoining reel or spool 16 through the engagement of the ears or dogs 25 and 26, thereby reeling in a length of flexible wire or cable 14 equal to the amount of lowering of the chassis or frame F and thus maintaining a suspension of conductor chain C at its original distance above the ground. Under the latter circumstances the chain or conductor assumes a slack position between its intermediate support and the frame F shown in dotted outline in Fig. 1. Similarly automatic adjustment of the chain length is provided for spring deflections due to dynamic impact.

Under certain circumstances a temporary and fleeting detention of the trailing end of the ground conductor is experienced due to impingement upon roadway irregularities and the like without a permanent engagement therewith. Resistance to tensions of this sort is provided in the reel mechanism by spool or reel 16 which revolves in response to the tension in ground conductor C and flexible cable 14 against the tension in the band spring 20.

Entanglement of the ground conductor member C in roadway irregularities is further precluded by the uniform inclination of the drag D to the road surface and by its tapered or convergent shape which minimizes a wedging action in crevices or the like.

The function of the stay line 56 is to hinder or dampen the undesirable oscillations of the ground conductor C produced by impact upon the ground surface and thereby maintain a more continuous circuit for the discharge of static electricity from the tank truck.

It will be apparent from the foregoing description that the construction described and illustrated herein is well suited for attaining the several enumerated objects of the invention which in its broad conception includes mechanism for mounting on a truck or other vehicle for transporting inflammable fluids constructed and arranged to vary the length of a trailing ground conductor supported from the vehicle in accordance with varying load on the vehicle and consequent change in elevation of the point of support. Preferably the mechanism comprises resilient supporting means for adjusting the trailing end of the cable and means suspended from the end of the cable for conducting the static electricity to the ground. However, it will be apparent that the trailing end of the cable may be used as the conductor if the cable is formed of conductive material. Other changes in the construction and arrangement of parts are intended within the spirit and scope of the invention. For example, I have shown a preferred arrangement of reel and spring elements, but it will be apparent that the other types of springs may be used to control the reel movements within the spirit and scope of the invention. Therefore, the accompanying drawings and description are intended to disclose a preferred embodiment of the invention, only.

It will be apparent that by the arrangement of parts disclosed, the trailing end of the conductor member is maintained at all times under varying load conditions at a substantially uniform distance from the point of suspension of said member on the truck body. In the preferred arrangement the normal inclination of the ground contacting member 50 permits it to follow ground irregularities, such as in passing over small depressions and the like, to maintain constant ground contact during movement of the vehicle.

The provision of the stay line 56 while not essential to a proper functioning of the mechanism is quite beneficial in damping or retarding oscillations of the conductor in travel induced by swaying of the vehicle.

What I claim and desire to secure by Letters Patent is:

1. In equalizing mechanism for mounting on a vehicle to control a ground conductor, a housing adapted for attachment to a surface of a vehicle, a shaft in the housing, a pair of cable-carrying reels having telescoped hub portions mounted for free rotary movement in side-by-side relation on said shaft, cooperative means on the reels constructed and arranged to hold said reels for positive conjoint rotation in one direction and to permit limited independent rotation thereof in the opposite direction, and a spring supported on the housing and engaging each reel for rotating the reel in one direction.

2. In equalizing mechanism for mounting on a vehicle to control a ground conductor, a housing adapted for attachment to a surface of a vehicle, a shaft in the housing, a pair of cable-carrying reels mounted for free rotary movement in side-by-side relation on said shaft, cooperative means on the reels constructed and arranged to hold said reels for positive conjoint rotation in the same direction and to permit limited independent rotation thereof in opposite directions, a spring supported on the housing and engaging each reel for rotating the reel in one direction, and bar means mounted on opposite ends of the housing and in engagement with said shaft for tensioning each spring.

3. In equalizing mechanism for mounting on a vehicle to control a ground conductor, a housing adapted for attachment to a surface of a vehicle, a shaft in the housing, a pair of cable-carrying reels mounted for free rotary movement in side-by-side relation on said shaft, cooperative means on the reels constructed and arranged to hold said reels for positive conjoint rotation in the same direction and to permit limited independent rotation thereof in opposite directions, a spring supported on the housing and engaging each reel for rotating the reel in one direction, and means engaging said shaft and mounted on the opposite ends of the housing for tensioning each spring.

4. In equalizing mechanism for mounting on a vehicle to control a ground conductor, a housing adapted for attachment to a surface of a vehicle, a shaft in the housing, a pair of cable-carrying reels mounted for free rotary movement in side-by-side relation on said shaft, said reels having interfitting hub portions, a coil spring having its inner end attached to the shaft and its outer end connected with a surface of each reel for rotating said reel in one direction, and cooperative means on the reels constructed and arranged to hold said reels for positive conjoint rotation in one direction and to permit limited independent rotation thereof in the opposite direction.

5. In a device for association with a vehicle having a frame structure and an axle assembly for maintaining a substantial uniform relationship between the road surface contacting portion of a ground conductor and the vehicle frame regardless of varying distances between the frame and the road surface, said device comprising reel means mounted on the vehicle frame, extensible means connecting the reel means and the axle assembly of the vehicle for controlling rotation of the reel means in accordance with variations in the distance between the vehicle frame structure and axle assembly, and other extensible connecting means between and connecting the reel means and the ground conductor to cause corresponding variations of the effective length of the ground conductor.

6. In a device for association with a vehicle having a frame and an axle movable relatively to the frame for maintaining a substantial uniform relationship between the road surface contacting portion of a ground conductor and the vehicle frame regardless of varying distances between the frame and the road surface, said device comprising two reels mounted on a common axis, a cable connecting one reel and the vehicle axle structure, another cable connecting the other reel and the road contacting portion of the conductor, spring means for biasing each reel in one direction, and connecting means between the reels for causing the axle cable controlled reel to permit both reels to be simultaneously turned by their spring means when the distance between the vehicle frame and axle is shortened and to cause the axle cable controlled reel to positively turn the other reel against the bias of its spring means when the distance between the frame and axle is lengthened, said connecting means permitting limited relative rotation of said reels in one direction.

7. An equalizing mechanism for vehicles adapted to control the length of a ground conductor attached to such vehicle, comprising a casing member, a pair of reels mounted for rotation about coinciding axes in said casing, springs arranged to induce rotation of each reel, a cable reeved about one said reel having one end attached to an axle of the vehicle, a second cable reeved about the other reel having a free end attached to a ground conductor, said mechanism being attached to the vehicle frame above the axle and being internally adapted to shorten the cable extending to the ground conductor when the distance between the axle and the mechanism is shortened.

GEORGE D. WICKMAN.

REFERENCES CITED

The following references are of record in the file of this patent:

UNITED STATES PATENTS

| Number | Name | Date |
| --- | --- | --- |
| 422,591 | Hayden et al. | Mar. 4, 1890 |
| 1,454,505 | Christen | May 8, 1923 |
| 1,528,877 | Hayden et al. | Mar. 10, 1925 |
| 1,977,692 | Norling | Oct. 23, 1934 |
| 1,999,414 | King | Apr. 30, 1935 |
| 2,084,523 | Crawford | June 22, 1937 |
| 2,164,076 | Osgood | June 27, 1939 |
| 2,169,734 | Hoppenstand | Aug. 15, 1939 |
| 2,280,327 | Ware | Apr. 21, 1942 |